US011082299B2

(12) United States Patent
Chou et al.

(10) Patent No.: US 11,082,299 B2
(45) Date of Patent: *Aug. 3, 2021

(54) MANAGING VIRTUAL LINKS IN A NETWORK SERVICE INSTANCE

(71) Applicant: APPLE INC., Cupertino, CA (US)

(72) Inventors: Joey Chou, Scottsdale, AZ (US); Yizhi Yao, Chandler, AZ (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,959

(22) Filed: Mar. 19, 2019

(65) Prior Publication Data

US 2019/0280938 A1 Sep. 12, 2019

Related U.S. Application Data

(60) Provisional application No. 62/648,131, filed on Mar. 26, 2018, provisional application No. 62/665,924, filed on May 2, 2018.

(51) Int. Cl.
*H04L 12/24* (2006.01)
(52) U.S. Cl.
CPC ............ *H04L 41/12* (2013.01); *H04L 41/082* (2013.01); *H04L 41/0806* (2013.01)
(58) Field of Classification Search
CPC .... H04L 41/12; H04L 41/0806; H04L 41/082
See application file for complete search history.

(56) References Cited

U.S. PATENT DOCUMENTS

| 10,545,779 | B2* | 1/2020 | Gokurakuji | ......... H04L 41/0806 |
|---|---|---|---|---|
| 2017/0012823 | A1* | 1/2017 | Zhu | ........................ H04W 28/08 |
| 2018/0024852 | A1* | 1/2018 | Yabushita | ............. G06F 9/5077 |
| | | | | 718/1 |
| 2018/0077020 | A1* | 3/2018 | Li | ......................... H04L 41/5054 |
| 2018/0241635 | A1* | 8/2018 | Rao | ..................... H04L 41/0816 |
| 2018/0324261 | A1* | 11/2018 | Yi | ............................. H04L 67/16 |
| 2019/0052549 | A1* | 2/2019 | Duggal | .............. G06Q 30/0635 |

(Continued)

OTHER PUBLICATIONS

GPP TS 28.526, "3rd Generation Partnership Project; Technical Specification Group Services and System Aspects; Telecommunication management; Life Cycle Management (LCM) for mobile networks that include virtualized network functions; Procedures (Release 14)", V0.3.0, Nov. 2016, 18 pages (Year: 2016).*

(Continued)

*Primary Examiner* — Jonathan A Bui
(74) *Attorney, Agent, or Firm* — Fay Kaplun & Marcin, LLP

(57) ABSTRACT

An apparatus of a Network Manager (NM) comprises one or more processors to send a Network Service (NS) update request to a Network Function Virtualization Orchestrator (NFVO) to add external connectivity to a Physical Network Function (PNF) instance or a Virtual Network Function (VNF) instance in an NS instance, to receive an operation result containing a lifecycle operation occurrence identifier from the NFVO, to receive a lifecycle change notification from the NFVO indicating a start of an NS update, and to receive an NS Lifecycle Change notification from the NFVO indicating a result of the NS update. A memory is to store the result of the NS update.

19 Claims, 8 Drawing Sheets

(56) References Cited

U.S. PATENT DOCUMENTS

| | | | |
|---|---|---|---|
| 2019/0171492 A1* | 6/2019 | Yousaf | G06F 9/542 |
| 2019/0260636 A1* | 8/2019 | Sun | H04L 41/082 |
| 2019/0334781 A1* | 10/2019 | Caldwell | G06F 9/45558 |
| 2019/0334788 A1* | 10/2019 | Lacey | G06F 21/105 |
| 2019/0394078 A1* | 12/2019 | Ghosh | G06F 9/45558 |
| 2020/0067782 A1* | 2/2020 | Yousaf | H04L 41/0893 |
| 2020/0106680 A1* | 4/2020 | Chen | H04L 41/06 |
| 2020/0113001 A1* | 4/2020 | Shimojou | H04L 12/4641 |
| 2020/0119995 A1* | 4/2020 | Marquezan | H04L 41/082 |
| 2020/0133708 A1* | 4/2020 | Li | H04L 41/5041 |
| 2020/0322232 A1* | 10/2020 | Xia | G06F 9/45558 |

OTHER PUBLICATIONS

ETSI, "Network Functions Virtualisation (NFV); Management and Orchestration; Os-Ma-Nfvo reference point—Interface and Information Model Specification," ETSI GS NFV-IFA 013 V2.1.1 (Oct. 2016), 127 pages (Year: 2016).*

* cited by examiner

MANAGING VIRTUAL LINKS IN A NETWORK SERVICE INSTANCE

CROSS-REFERENCE TO RELATED APPLICATIONS

The present application claims the benefit of U.S. Provisional Application No. 62/648,131 (AB0013-Z) filed Mar. 26, 2018 and U.S. Provisional Application No. 62/665,924 (AB1122-Z) filed May 5, 2018. Said Application No. 62/648,131 and said Application No. 62/665,924 are hereby incorporated herein by reference in their entireties.

BACKGROUND

The architecture of Fifth Generation (5G) network architecture consists of 5G core Network Functions (NFs) such as User Plane Function (UPF), Session Management Function (SMF), Network Slice Select Function (NSSF), and Network Exposure Function (NEF). The architecture also consists of a Next Generation (NG) Radio Access Network (RAN) where the functional split feature splits a Next Generation NodeB (gNB) into a gNB Centralized Unit (gNB) that implements the upper layer gNB function and a gNB Distributed Unit (gNB-DU) that implements the lower layer gNB function. The gNB-CU can be implemented as a Virtualized Network Function (VNF), and the gNB-DU can be implemented as a Physical Network Function (PNF). A network operator can create a virtualized 5G network by using European Telecommunications Standards Institute (ETSI) Network Function Virtualization (NFV) lifecycle management function to instantiate a Network Service (NS) in the cloud that contains Virtual Network Functions (VFNs) such as 5G core NFs and the gNB-CU, and PNFs such as the gNB-DU.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
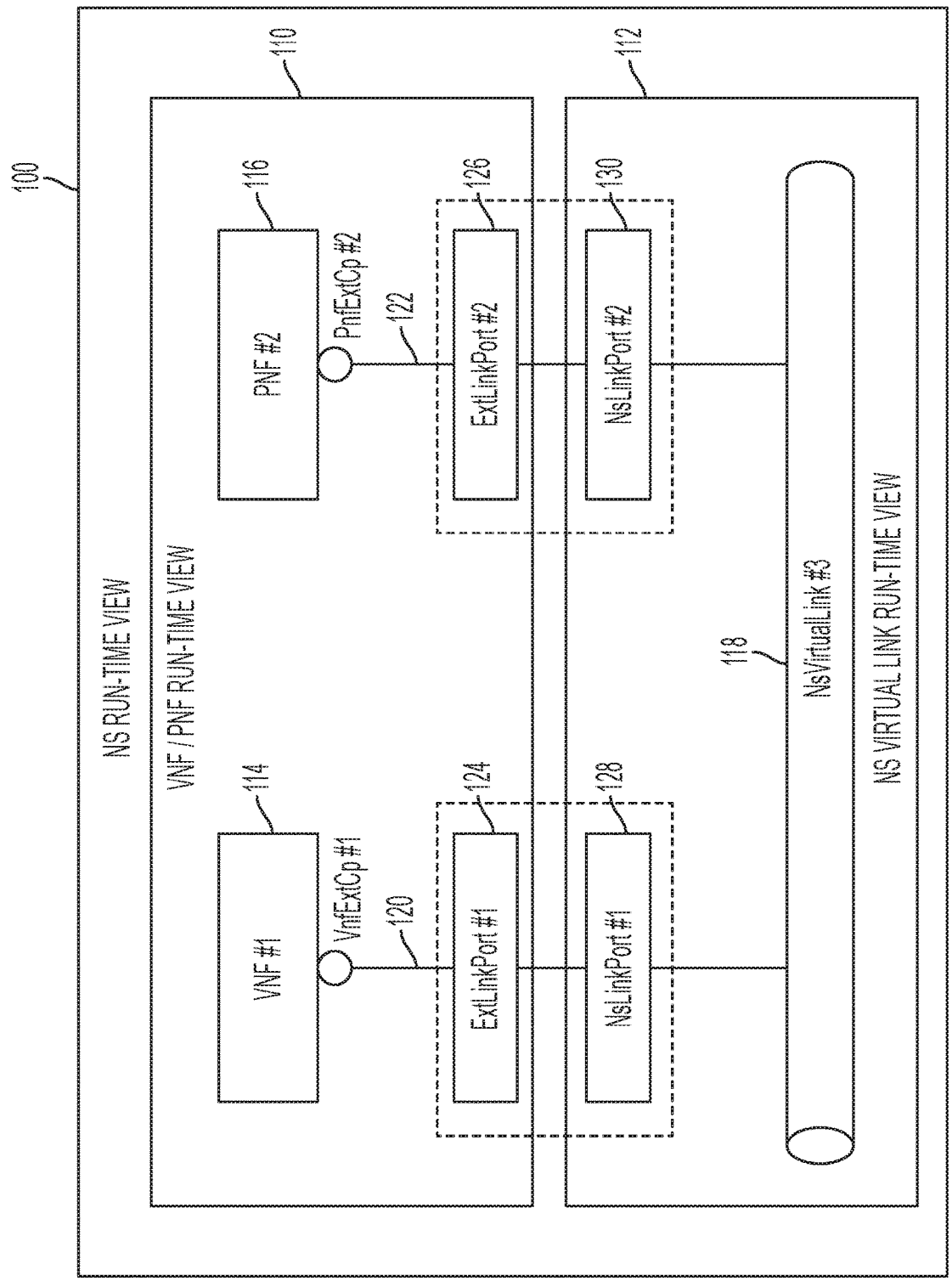
FIG. 1 is a diagram of a network service run-time view in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

FIG. 1 is a diagram of a network service run-time view in accordance with one or more embodiments. The core network functions of Fifth Generation (5G) networks and the 5G NodeB Centralized Unit (gNB-CU) can be implemented as Virtualized Network Functions (VNFs), and the gNB Distributed Unit (gNB-DU) can be implemented as a PNF (Physical Network Function). Network operators can create virtualized 5G networks by using European Telecommunications Standards Institute (ETSI) Network Function Virtualization (NFV) lifecycle management function to instantiate a NS (Network Service) in the cloud that contains Virtual Network Functions (VFNs) such as 5G core NFs and the gNB-CU, and PNFs such as the gNB-DU. FIG. 1 shows the connectivity between VNF and PNF that is implemented by a Network Service (NS) virtual link. For example, NS run-time view 100 includes VNF/PNF run-time view 110 and NS Virtual Link run-time view 112. As shown in FIG. 1, virtual network function (VNF #1) 114 is connected to NS virtual link (NsVirtualLink #3) 118 via VNF external connection point (VnfExtCP #1) 120, and physical network function (PNF #2) 116 is connected to NS virtual link (NsVirtualLink #3) 118 via PNF external connection point (PnfExtCp #2). External link ports (ExtLinkPort #1) 124 and (ExtLinkPort #2) 126 of VNF/PNF run-time view 110 couple to NS link ports (NsLinkPort #1) 128 and (NsLinkPort #2) 130 of NS Virtual Link run-time view 112.

Figure 2:
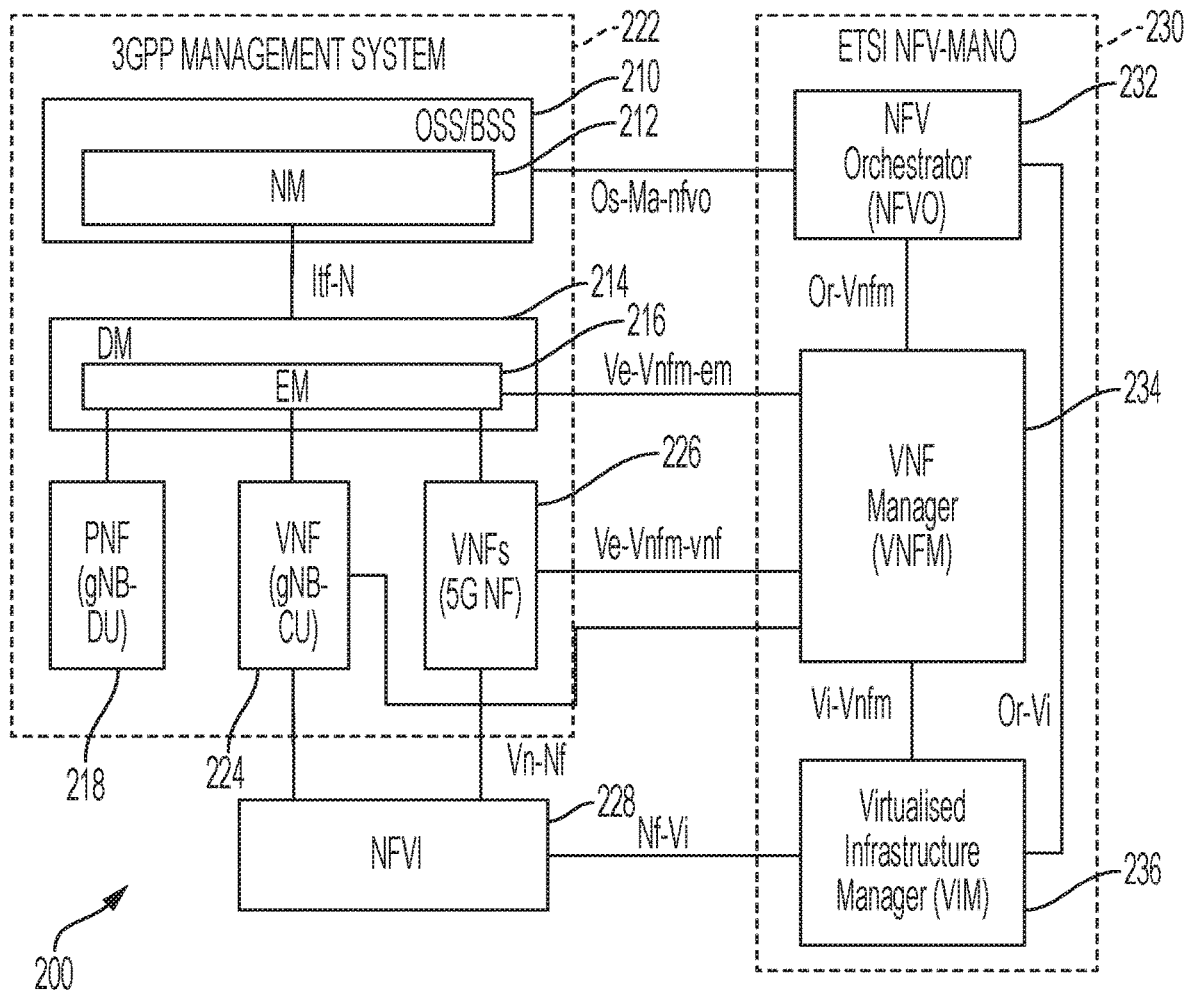
FIG. 2 is a diagram of a Third Generation Partnership Project (3GPP) management and a European Telecommunications Standards Institute (ETSI) Network Function Virtualization (NFV) Management and Orchestration (MANO) architecture in accordance with one or more embodiments.

FIG. 2 is a diagram of a Third Generation Partnership Project (3GPP) management and a European Telecommunications Standards Institute (ETSI) Network Function Virtualization (NFV) Management and Orchestration (MANO)

architecture in accordance with one or more embodiments. The 3GPP management system network management architecture 200 is based on Fourth Generation (4G) networks which may be subject to change in Fight Generation (5G) networks. As used herein, the term "Network Management Function (NM)" for 5G plays a similar role as the NM in 4G, and the scope of the claimed subject matter is not limited in this respect.

As shown in FIG. 2, network management architecture 200 can include an Operations Support System and/or Business Support System (OSS/BSS) 210, Network Manager (NM) 212, Domain Manager (DM) 214, and Element Manager (EM) 216. Where the NFV environment comprises a Third Generation Partnership Project (3GPP) network, the NM 212, DM 214, and EM 216 can comprise a 3GPP Management System 222. Such a 3GPP Management System can control one or more network elements (NEs) that operate as a Physical Network Function (PNF) (gNB-DU) 218, and further can control one or more Virtual Network Functions (VNFs), for example VNF (gNB-CU) 224 and/or VNF (5G NF) 226. An NFV Infrastructure (NFVI) 228 comprises hardware and/or software to realize the VNF blocks. In accordance with one or more embodiments, network architecture 200 can operate in compliance with a 3GPP standard, for example 3GPP Technical Standard 28.500 V14.1.0 (2017 March) or in compliance with European Telecommunications Standards Institute (ETSI) Group Specification (GS) NFV 002 V1.1.1 (2013 March), although the scope of the claimed subject matter is not limited in these respects.

In one or more embodiments, NFV Management and Orchestration (NFV-MANO) 230 comprises and architectural framework to manage and orchestrate the VNF blocks of NFV management architecture 200, for example to implement one or more VNF blocks as one or more virtual machines running on NFVI 228. The NFV-MANO 230 can include NFV Orchestrator (NFVO) 232, VNF Manager (VNFM) 234, and/or Virtualized Infrastructure Manager (VIM) 236. Furthermore, NVF-MANO 230 can include one or more interfaces to couple with OSS/BSS 210, EM 216, one or more VNF blocks, and NFVI 228.

In one or more embodiments, NM 212 can add external connectivity to a PNF 218 or VNF instance in a NS. Such external connectivity may be added when a VNF instance that has been instantiated or added in a NS may not have enough external connectivity, for example due the lack of an ExtVirtualLink 118 in the action of instantiating new VNF instances in the NS instance, when some NsVirtualLinkConnectivity is not ready for a VNFProfile in the NSD when instantiating the NS. Such external connectivity also can be added when some connectivity for a PNF instance in a NS may have not been established yet. In addition. When the NS is updated to have more PNF or VNF instances, new connectivity may be needed between the existing PNF or VNF instances and the new PNF or VNF instances. For instance, when some new eNBs are added to a NS, some new connectivity may be needed for Mobility Management Entity (MME) VNFs. The following use cases can be added to 3GPP TS 28.525 to enable operators to add external connectivity to a PNF or VNF instance, for example section 6.4.3.18 of 3GPP TS 28.525 V15.0.0 (2018 June).

TABLE 1

Use Cases for adding external connectivity to PNF or VNF instance

| Use Case | Evolution/Specification |
|---|---|
| Goal | Add external connectivity to a PNF or VNF instance. |
| Actors and Roles | NM |

TABLE 1-continued

Use Cases for adding external connectivity to PNF or VNF instance

| Use Case | Evolution/Specification |
|---|---|
| Telecom resources | NFVO |
| Assumptions | NM is subscribed to receive the NS LCM notifications. |
| Pre-conditions | A PNF or VNF instance has been added or instantiated in an NS instance without the external connectivity, or a new external connectivity is needed due to PNF or VNF upgrade. |
| Begins when | NM determines (e.g. by operator's request) that it is necessary to add the external connectivity to an existing PNF or VNF instance. |
| Step 1 (M) | NM sends a request to the NFVO to update the NS instance by adding the external connectivity to an existing PNF or VNF instance. |
| Step 2 (M) | NFVO returns to the NM lifecycleOperationOccurrenceId and processes the request |
| Step 3 (M) | NFVO sends to NM Lifecycle Change Notification indicating start of the operation. |
| Step 4 (M) | NFVO sends to NM Lifecycle Change Notifications indicating progress of the operation. |
| Step 5 (M) | NFVO sends to NM Lifecycle Change Notification indicating result of the operation. |
| Ends when | All the steps identified above are successfully completed. |
| Exceptions | One of the steps identified above fails. |
| Post-conditions | The external connectivity has been added to the PNF or VNF instance according to the operator's needs. |
| Traceability | REQ-NFV_LCM_Os-Ma-nfvo-FUN-x |

For REQ-NFV_LCM_Os-Ma-nfvo-FUN-x, the Os-Ma-nfvo reference point shall support a capability allowing NM to request the addition of the external connectivity to a PNF or VNF instance as part of NS update. The NM 212 can add a new virtual link instance to a NS instance, for example when no virtual link is available for use, or when a new virtual link is needed due to the update of NS. The NM 212 also can remove a virtual link from a NS instance when it is no longer needed.

The following lists use cases and requirements to be added to 3GPP TS 28.525 to enable operators to add a virtual link to a NS instance, and remove a virtual link from a NS instance.

TABLE 2

6.4.3.x Add a virtual link to a NS instance

| Use Case | Evolution/Specification |
|---|---|
| Goal | Add a virtual link to a NS instance. |
| Actors and Roles | NM |
| Telecom resources | NFVO |
| Assumptions | NM is subscribed to receive the NS LCM notifications. |
| Pre-conditions | The NS where the virtual link is to be added has been instantiated. The virtual link descriptor and virtual link profile for the virtual link to be added are available in the NSD either on-boarded originally or updated. |
| Begins when | NM determines (e.g. by operator's request) that it is necessary to add a virtual link to an existing NS instance. |
| Step 1 (M) | NM sends a request to the NFVO to update the NS instance to add a virtual link. |
| Step 2 (M) | NFVO returns to the NM lifecycleOperationOccurrenceId and processes the request |
| Step 3 (M) | NFVO sends to NM Lifecycle Change Notification indicating start of the operation. |
| Step 4 (M) | NFVO sends to NM Lifecycle Change Notifications indicating progress of the operation. |
| Step 5 (M) | NFVO sends to NM Lifecycle Change Notification indicating result of the operation. |
| Ends when | All the steps identified above are successfully completed. |
| Exceptions | One of the steps identified above fails. |

TABLE 2-continued 6.4.3.x Add a virtual link to a NS instance

| Use Case | Evolution/Specification |
|---|---|
| Post-conditions | A virtual link has been added to the NS instance according to the operator's needs. |
| Traceability | REQ-NFV_LCM_Os-Ma-nfvo-FUN-x |

TABLE 3

6.4.3.y Remove a virtual link from a NS instance

| Use Case | Evolution/Specification |
|---|---|
| Goal | Remove a virtual link from a NS instance. |
| Actors and Roles | NM |
| Telecom resources | NFVO |
| Assumptions | NM is subscribed to receive the NS LCM notifications. |
| Pre-conditions | A virtual link in a NS instance is not used by any PNF or VNF instance, and is no longer needed. |
| Begins when | NM determines (e.g. by operator's request) that it is necessary to remove the virtual link from an existing NS instance. |
| Step 1 (M) | NM sends a request to the NFVO to update the NS instance to remove a virtual link. |
| Step 2 (M) | NFVO returns to the NM lifecycleOperationOccurrenceId and processes the request |
| Step 3 (M) | NFVO sends to NM Lifecycle Change Notification indicating start of the operation. |
| Step 4 (M) | NFVO sends to NM Lifecycle Change Notifications indicating progress of the operation. |
| Step 5 (M) | NFVO sends to NM Lifecycle Change Notification indicating result of the operation. |
| Ends when | All the steps identified above are successfully completed. |
| Exceptions | One of the steps identified above fails. |
| Post-conditions | The virtual link has been removed from the NS instance according to the operator's needs. |
| Traceability | REQ-NFV_LCM_Os-Ma-nfvo-FUN-y |

For REQ-NFV_LCM_Os-Ma-nfvo-FUN-x, the Os-Ma-nfvo reference point shall support a capability allowing NM 212 to request the addition of virtual link to a NS instance as part of NS update. For REQ-NFV_LCM_Os-Ma-nfvo-FUN-y, the Os-Ma-nfvo reference point shall support a capability allowing NM to request the removal of virtual link from a NS instance as part of NS update.

Figure 3:
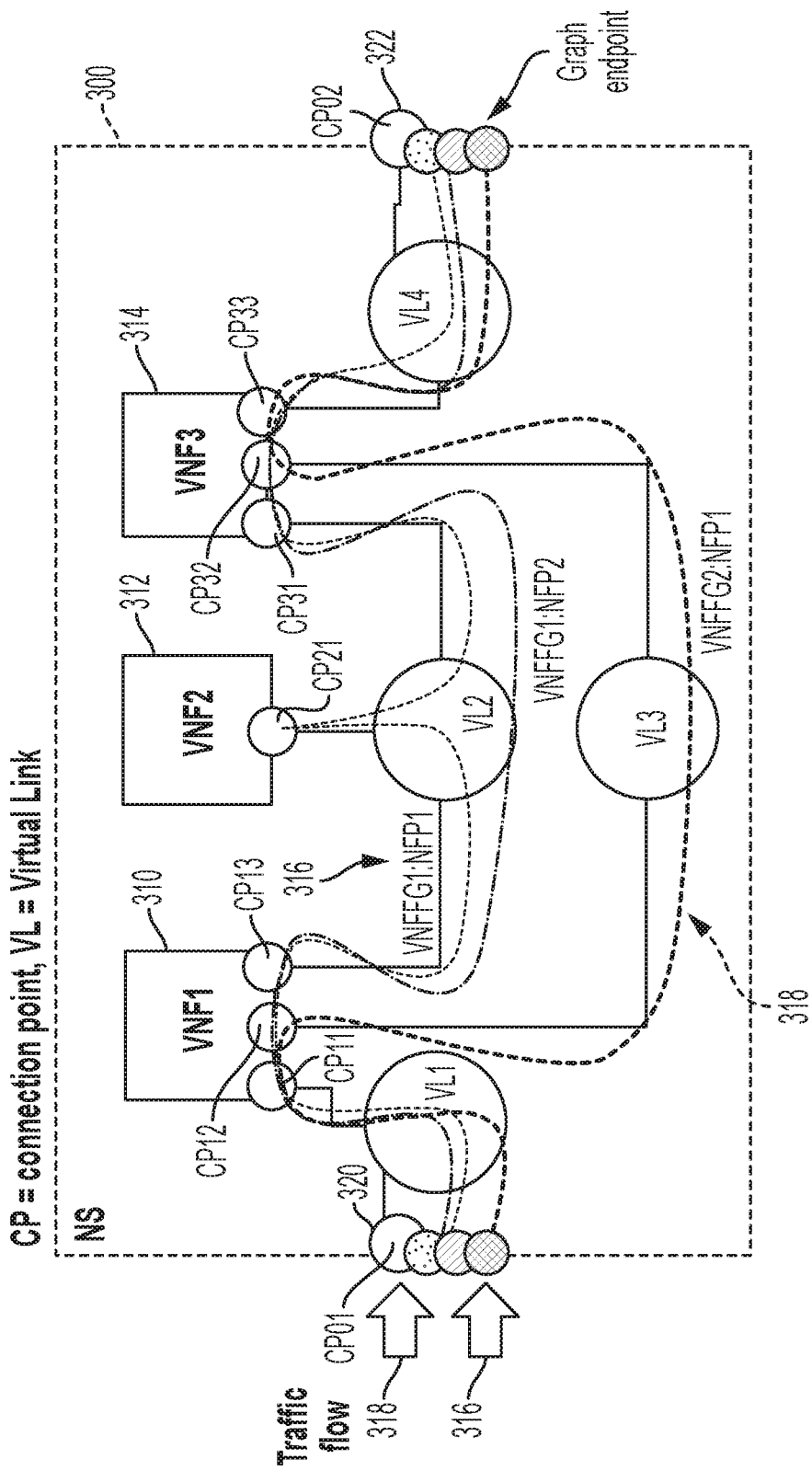
FIG. 3 is a diagram of a network service with two Virtual Network Function Forwarding Graphs (VNFFGs) with different Network Forwarding Paths (NFPs) in accordance with one or more embodiments.

Referring now to FIG. 3, a diagram of a network service with two Virtual Network Function Forwarding Graphs (VNFFGs) with different Network Forwarding Paths (NFPs) in accordance with one or more embodiments will be discussed. FIG. 3 shows a Network Service (NS) 300 containing three Virtual Network Functions (VNFs), (VNF1) 310, (VNF2) 312, and (VNF3) 314 with two VNF Forwarding Graphs (VNFFGs), (VNFFG1) 316 and (VNFFG2) 318 where each VNFFG can contain one or more Network Forwarding Paths (NFPs).

The VNFFG is used to connect VNF instances in a NS via Service Access Point (SAP) such as Connection Points (CPs) such as (CP01) 320 and (CP02) 322 that are the entry point and exit point of a NS. In the example of FIG. 3, VNFFG2:NFP1 traverses through CP1, CP11, CP12, CP32, CP33, and CP02, VNFFG1:NFP1 traverses through CP1, CP11, CP13, CP21, CP32, CP33, and CP02, and VNFFG1:NFP2 traverses through CP1, CP11, CP13, CP32, CP33, and CP02.

The European Telecommunications Standards Institute (ETSI) Group Specification (GS) NFV-IFA 013 defines Update NS operation (see clause 7.3.5) to allow operators to create a VNFFG in a NS, or update a VNFFG instance in a NS. The following two actions, however in the Update NS operation are missing important information that prevents VNFFG addition and update from working. In one or more embodiments, the following information may be added to ETSI GS NFV-IFA 013. One embodiment is to add VNFFG action to add a VNFFG with NFP to a NS wherein the following parameters can be added. Added input parameters include NFP data information that characterizes the NFP, and added output parameters including NFP identifier indicating the NFP instance being added to a VNFFG, and VNFFG identifier indicating the VNFFG instance in which the NFP instance is contained. Another embodiment is to update VNFFG action to add an NFP to a given VNFFG wherein the following parameters can be added. Added output parameter—NFP identifier, indicating the NFP instance being added to the VNFFG.

The following shows the Update NS operation from ETSI GS NFV-IFA013, with selected actions being impacted. Furthermore, the subject matter discussed herein may added to 3GPP TS 28.525, for example section 6.4.3.19 of 3GPP TS 28.525 V.15.0.0 (2018 June) and section 6.4.3.20 of 3GPP TS 28.525 V15.0.0 (2018 June).

7.3.5 Update NS Operation 7.3.5.1 Introduction

This operation updates an NS instance. This operation is also used to embed VNF LCM operations in support of fine grained NS LCM approach. See the informative message flows in annex C. Actions that can be performed with an update include:

Adding existing VNF instances to the NS instance.
Removing VNF instances from the NS instance.
Instantiating new VNF instances and adding them to the NS instance.
Changing the DF of VNF instances belonging to the NS instance.
Changing the operational state of a VNF instance belonging to the NS instance.
Modifying information data and/or the configurable properties of a VNF instance belonging to the NS instance.
Changing the external connectivity of a VNF instance belonging to the NS instance.
Adding SAPs to the NS instance.
Removing SAPs from the NS instance.
Adding existing NS instances to the NS instance.
Removing nested NS instances from the NS instance.
Associate a new NSD version to the NS instance.
Moving VNF instances from one NS instance to another NS instance.
Adding VNFFGs to the NS instance.
Removing VNFFGs from the NS instance.
Update VNFFGs of the NS instance.
Changing the DF of the NS instance.
Adding PNFs to the NS instance.
Modifying PNFs in the NS instance.
Removing PNFs from the NS instance.

In the above list, adding VNFFGs to the NS instance and updating VNFFGs of the NS instance are impacted. Only one type of update shall be allowed per operation.

Table 4 below comprises Table 7.3.5.1-1 from ETSI GS NFV-IFA013 which lists the information flow exchanged between the OSS/BSS 210 and the NFVO 232. It is possible, however, to request several updates of a given type in one Update NS operation as indicated in the cardinalities in table 7.3.5.2-1.

TABLE 4

Table 7.3.5.1-1: Update NS operation

| Message | Requirement | Direction |
|---|---|---|
| UpdateNsRequest | Mandatory | OSS/BSS NFVO |
| UpdateNsResponse | Mandatory | NFVO OSS/BSS |

The input parameters (7.3.5.2 Input parameters) sent when invoking the operation shall follow the indications provided in Table 5 below, which comprises table 7.3.5.2-1 from ETSI GS NFV-IFA013.

TABLE 5

Table 7.3.5.2-1: Update NS operation input parameters

| Parameter | Qualifier | Cardinality | Content | Description |
|---|---|---|---|---|
| nsInstanceId | M | 1 | Identifier | Identifier of the NS instance being updated. |
| updateType | M | 1 | Enum | Specifies the type of update. This parameter determines also which one of the following parameter is present in the operation. Possible values are: AddVnf (adding existing VNF instance(s)), RemoveVnf (removing VNF instance(s)), InstantiateVnf (instantiating new VNF(s)), ChangeVnfDf (Changing VNF DF), OperateVnf (changing VNF state), ModifyVnfInformation (modifying VNF information and/or the configurable properties of VNF instance(s)), ChangeExtVnfConnectivity (changing the external connectivity of VNF instance(s)), AddSap (adding SAP(s)), RemoveSap (removing SAP(s)), AddNestedNs (adding existing NS instance(s) as nested NS(s)), RemoveNestedNs (removing existing nested NS instance(s)), AssocNewNsdVersion (associating a new NSD version to the NS instance), MoveVnf (moving VNF instance(s) from one origin NS instance to a another target NS instance), AddVnffg (adding VNFFG(s)), RemoveVnffg (removing VNFFG(s)), UpdateVnffg (updating VNFFG(s)), ChangeNsDf (changing NS DF), AddPnf (adding PNF), ModifyPnf(modify PNF), RemovePnf (removing PNF). |
| addVnfInstance | M | 0 ... N | VnfInstanceData | Specify an existing VNF instance to be added to the NS instance. This parameter shall be present only if updateType = AddVnf. |
| removeVnfInstanceId | M | 0 ... N | Identifier | Specify an existing VNF instance to be removed from the NS instance. The parameter contains the identifier(s) of the VNF instances to be removed. This parameter shall be present only if updateType = RemoveVnf. See note 1. |
| instantiateVnfData | M | 0 ... N | InstantiateVnfData | Specify the new VNF to be instantiated. This parameter can be used e.g. for the bottom-up NS creation. This parameter shall be present only if updateType = InstantiateVnf. |

TABLE 5-continued

Table 7.3.5.2-1: Update NS operation input parameters

| Parameter | Qualifier | Cardinality | Content | Description |
|---|---|---|---|---|
| changeVnfFlavourData | M | 0 . . . N | ChangeVnfFlavourData | Specify the new DF of the VNF instance to be changed to. This parameter shall be present only if updateType = ChangeVnfDf. |
| operateVnfData | M | 0 . . . N | OperateVnfData | Specify the state of the VNF instance to be changed. This parameter shall be present only if updateType = OperateVnf. |
| modifyVnfInfoData | M | 0 . . . N | ModifyVnfInfoData | Specify the VNF Information parameters and/or the configurable properties of VNF instance to be modified. This parameter shall be present only if updateType = ModifyVnfInformation. |
| changeExtVnfConnectivityData | M | 0 . . . N | ChangeExtVnfConnectivityData | Specify the new external connectivity data of the VNF instance to be changed. This parameter shall be present only if updateType = ChangeExtVnfConnectivity. |
| addSap | M | 0 . . . N | SapData | Specify a new SAP to be added to the NS instance. This parameter shall be present only if updateType = AddSap. |
| removeSapId | M | 0 . . . N | Identifier | Specify an existing SAP to be removed from the NS instance. The parameter shall be present only if updateType = RemoveSap. |
| addNestedNsId | M | 0 . . . N | Identifier | Specify an existing nested NS instance to be added to (nested within) the NS instance. This parameter shall be present only if updateType = AddNestedNs. |
| removeNestedNsId | M | 0 . . . N | Identifier | Specify an existing nested NS instance to be removed from the NS instance. The parameter shall be present only if updateType = RemoveVnfNestedNs. |
| assocNewNsdVersionData | M | 0 . . . 1 | AssocNewNsdVersionData | Specify the new NSD to be used for the NS instance. This parameter shall be present only if updateType = AssocNewNsdVersion. |
| moveVnfInstanceData | M | 0 . . . N | MoveVnfInstanceData | Specify existing VNF instance to be moved from one NS instance to another NS instance. This parameter shall be present only if updateType = MoveVnf. |
| addVnffg | M | 0 . . . N | AddVnffgData | Specify the new VNFFG to be created to the NS Instance. This parameter shall be present only if updateType = AddVnffg. |
| removeVnffgId | M | 0 . . . N | Identifier | Identifier of an existing VNFFG to be removed from the NS Instance. This parameter shall be present only if updateType = RemoveVnffg. |
| updateVnffg | M | 0 . . . N | UpdateVnffgData | Specify the new VNFFG Information data to be updated for a VNFFG of the NS Instance. This parameter shall be present only if updateType = UpdateVnffg. |
| changeNsFlavourData | M | 0 . . . 1 | ChangeNsFlavourData | Specifies the new DF to be applied to the NS instance. It shall be present only if updateType = ChangeNsDf. |
| updateTime | M | 0 . . . 1 | DateTime | Timestamp indicating the update time of the NS, i.e. the NS will be updated at this timestamp. Cardinality "0" indicates the NS update takes place immediately. |
| addPnfData | M | 0 . . . N | AddPnfData | Information of the PNF(s) that are being added into the NS instance. This parameter shall be present only if updateType = AddPnf. |
| modifyPnfData | M | 0 . . . N | ModifyPnfData | Information on the PNF(s) that are being modified in this NS instance. |

TABLE 5-continued

Table 7.3.5.2-1: Update NS operation input parameters

| Parameter | Qualifier | Cardinality | Content | Description |
|---|---|---|---|---|
| removePnfId | M | 0 ... N | Identifier | This parameter shall be present only if updateType = ModifyPnf. See note 2 Identifier of the PNF(s) that are part of this NS instance and that should be deleted from it. This parameter shall be present only if updateType = RemovePnf. |

NOTE 1:
If a VNF instance is removed from an NS and this NS was the last one for which this VNF instance was a part, the VNF instance is terminated by the NFVO.
NOTE 2:
New CP addresses should be contained in the element, if PNF CPs need to be changed.

The following shows the text being added to both input and output parameters to support the Add VNFFG action.

8.3.4.21 AddVnffgData Information Element

8.3.4.21.1 Description

This information element specifies the parameters that are needed for the creation of a new VNFFG instance.

8.3.4.21.2 Attributes

The attributes of the AddVnffgData information element shall follow the indications provided in Table 6 which comprises Table 8.3.4.21.2 from ETSI GS NFV-IFA0131.

TABLE 6

Table 8.3.4.21.2-1: Attributes of the AddVnffgData information element

| Attribute | Qualifier | Cardinality | Content | Description |
|---|---|---|---|---|
| vnffgdId | M | 1 | Identifier(Reference to Vnffgd) | Identifier of the VNFFGD which defines the VNFFG to be added. |
| vnffgName | M | 1 | String | Human readable name for the VNFFG. |
| description | M | 1 | String | Human readable description for the VNFFG. |
| nfp | N | 0 ... N | NfpData | Indicate the desired new NFP(s) for a given VNFFG after the operations of addition/removal of NS components (e.g. VNFs, VLs, etc.) have been completed, or indicate the NFP classification and selection rule for the new NFP to be added to the VNFFG instance. |

7.3.5 Update NS Operation

7.3.5.3 Output Parameters

The output parameter returned by the operation shall follow the indications provided in Table 7 comprising Table 7.3.5.3-1 from ETSI GS NFV-IFA0131.

TABLE 7

Table 7.3.5.3-1: Update NS operation output parameters

| Parameter | Qualifier | Cardinality | Content | Description |
|---|---|---|---|---|
| vnfInstanceId | M | 0 ... N | Identifier | Identifier of the instance of the instantiated VNF. This information shall be retuned as the result of the operation if successful. |
| pnfId | M | 0 ... N | Identifier | Identifier of the PNF assigned by OSS. It shall be present only if updateType = AddPnf. This information shall be returned as the result of the operation if successful. |

TABLE 7-continued

Table 7.3.5.3-1: Update NS operation output parameters

| Parameter | Qualifier | Cardinality | Content | Description |
|---|---|---|---|---|
| addedVnffgInfo | M | 0...N | AddedVnffgInfo | Information of the instance of the created VNFFG. It shall be present only if updateType = AddVnffg. This information shall be returned as the result of the operation if successful. |
| sapId | M | 0...N | Identifier | Identifier of the instance of the created SAP. It shall be present only if updateType = addSap. This information shall be returned as the result of the operation if successful. |
| lifecycleOperationOccurrenceId | M | 1 | Identifier | The identifier of the NS lifecycle operation occurrence. This information shall be returned immediately before any notification, message or operation is done |

8.3.4.x AddedVnffgInfo Information Element 8.3.4.x.1 Description

This information element specifies the VNFFG instance being added to a NS instance. 8.3.4.x.2 Attributes The attributes of the AddedVnffgInfo information element shall follow the indications provided in Table 8 comprising Table 8.3.4.x.2-11 from ETSI GS NFV-IFA0131.

TABLE 8

Table 8.3.4.X.2-1: Attributes of the AddVnffgInfo information element

| Attribute | Qualifier | Cardinality | Content | Description |
|---|---|---|---|---|
| vnffgId | M | 0...1 | Identifier | Identifier of the instance of the created VNFFG. |

TABLE 8-continued

Table 8.3.4.X.2-1: Attributes of the AddVnffgInfo information element

| Attribute | Qualifier | Cardinality | Content | Description |
|---|---|---|---|---|
| nfpId | M | 0...N | Identifier (Reference to Nfp)) | Identifier(s) of the NFP to be added to a given VNFFG. |

The following shows the text being added to the output parameters to support the Update VNFFG action.

7.3.5 Update NS Operation 7.3.5.3 Output Parameters

The output parameter returned by the operation shall follow the indications provided in Table 9 comprising table 7.3.5.3-1 from ETSI GS NFV-IFA0131.

TABLE 9

Table 7.3.5.3-1: Update NS operation output parameters

| Parameter | Qualifier | Cardinality | Content | Description |
|---|---|---|---|---|
| vnfInstanceId | M | 0...N | Identifier | Identifier of the instance of the instantiated VNF. This information shall be retuned as the result of the operation if successful. |
| pnfId | M | 0...N | Identifier | Identifier of the PNF assigned by OSS. It shall be present only if updateType = AddPnf. This information shall be returned as the result of the operation if successful. |
| vnffgId | M | 0...N | Identifier | Identifier of the instance of the created VNFFG. It shall be present only if updateType = AddVnffg. This information shall be returned as |

TABLE 9-continued

| | Table 7.3.5.3-1: Update NS operation output parameters | | | |
|---|---|---|---|---|
| Parameter | Qualifier | Cardinality | Content | Description |
| sapId | M | 0 . . . N | Identifier | the result of the operation if successful. Identifier of the instance of the created SAP. It shall be present only if updateType = addSap. This information shall be returned as the result of the operation if successful. |
| lifecycleOperationOccurrenceId | M | 1 | Identifier | The identifier of the NS lifecycle operation occurrence. This information shall be returned immediately before any notification, message or operation is done |
| nfpId | M | 0 . . . N | Identifier | Identifier(s) of the NFP being deleted to a given VNFFG. It shall be present only if updateType = UpdateVnffg. This information shall be returned as the result of the operation if successful. |

The following use cases, requirements, and procedures are added to TS 28.525 to describe how NM 212 or 3GPP operators can use Add VNFFG and Update VNFFG actions in the NS update operation to add VNFFG with NFP to a NS instance.

TABLE 10

| 6.4.3.x Add VNF forwarding graph to a NS instance | |
|---|---|
| Use Case | Evolution/Specification |
| Goal | Add VNF forwarding graph to a NS instance. |
| Actors and Roles | NM |
| Telecom resources | NFVO |
| Assumptions | NM is subscribed to receive the NS LCM notifications. |
| Pre-conditions | An NS instance, containing the VNF instances and all necessary components (e.g. VLs, CPs, SAPs, . . .) to form a VNFFG, has been instantiated, VNFFGD for the VNFFG to be added already exists. |
| Begins when | NM determines (e.g. by operator's request) that it is necessary to add a VNFFG to a NS instance. |
| Step 1 (M) | NM sends a request to the NFVO to update the NS instance (see clause 7.3.5 in [6]) by adding a VNFFG to a NS instance. |
| Step 2 (M) | NFVO returns to the NM lifecycleOperationOccurrenceId and processes the request |
| Step 3 (M) | NFVO sends to NM Lifecycle Change Notification indicating start of the operation. |
| Step 4 (M) | NFVO sends to NM Lifecycle Change Notifications indicating progress of the operation. |
| Step 5 (M) | NFVO sends to NM Lifecycle Change Notification indicating result of the operation. |
| Ends when | All the steps identified above are successfully completed. |
| Exceptions | One of the steps identified above fails. |

TABLE 10-continued

| 6.4.3.x Add VNF forwarding graph to a NS instance | |
|---|---|
| Use Case | Evolution/Specification |
| Post-conditions | The VNFFG has been added to the NS instance according to the operator's needs. |
| Traceability | REQ-NFV_LCM_Os-Ma-nfvo-FUN-x |

TABLE 11

| 6.4.3.x Update VNF forwarding graph in a NS instance | |
|---|---|
| Use Case | Evolution/Specification |
| Goal | Update VNF forwarding graph in a NS instance. |
| Actors and Roles | NM |
| Telecom resources | NFVO |
| Assumptions | NM is subscribed to receive the NS LCM notifications. |
| Pre-conditions | An NS instance with VNFFG already exists, VNFFGD for the VNFFG to be updated already exists. |
| Begins when | NM determines (e.g. by operator's request) that it is necessary to update the VNFFG in a NS instance. |
| Step 1 (M) | NM sends a request to the NFVO to update the VNFFG (e.g. addition, deletion, and modification of NFP) in a NS instance via the NS update operation (see clause 7.3.5 in [6]). |
| Step 2 (M) | NFVO returns to the NM lifecycleOperationOccurrenceId, and the identifier of new NFP if the update is to add a NFP to the existing VNFFG, and processes the request. |
| Step 3 (M) | NFVO sends to NM Lifecycle Change Notification indicating start of the operation. |

TABLE 11-continued 6.4.3.x Update VNF forwarding graph in a NS instance

| Use Case | Evolution/Specification |
|---|---|
| Step 4 (M) | NFVO sends to NM Lifecycle Change Notifications indicating progress of the operation. |
| Step 5 (M) | NFVO sends to NM Lifecycle Change Notification indicating result of the operation. |
| Ends when | All the steps identified above are successfully completed. |
| Exceptions | One of the steps identified above fails. |
| Post-conditions | The VNFFG has been updated to the NS instance according to the operator's needs. |
| Traceability | REQ-NFV_LCM_Os-Ma-nfvo-FUN-x |

For REQ-NFV_LCM_Os-Ma-nfvo-FUN-x, the Os-Ma-nfvo reference point shall support a capability allowing NM 212 to request the addition of the VNFFG as part of NS update (covered by requirement Os-Ma-nfvo.NsLcm.027 in ETSI GS NFV-IFA 013 [6]).

Figure 4:
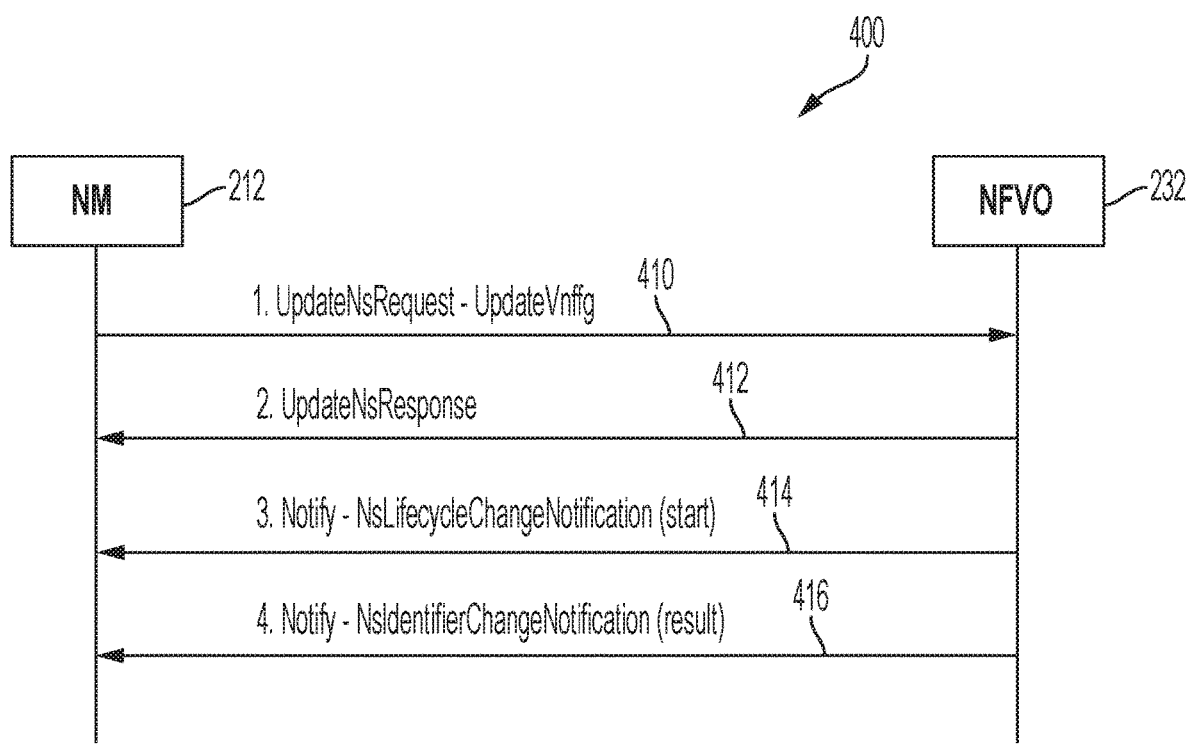
FIG. 4 is a diagram of a VNFFG update procedure to add, delete, or modify an NFP to a VNFFG instance in accordance with one or more embodiments.

FIG. 4 is a diagram of a VNFFG update procedure to add, delete, or modify an NFP to a VNFFG instance in accordance with one or more embodiments as discussed below. As shown in FIG. 4, in VNFFG update procedure 400, NM 212 sends an UpdateNsRequest—UpdateVnffg message to NFVO 212 at operation 410. NFVO 232 responds to NM 212 with an UpdateNsResponse message at operation 412. NFVO 232 sends Notify—NsLifecycleChangeNotification (start) message to NM 212 at operation 414. NFVO 232 then sends Notify—NsIndentifierChangeNotification (result) message to NM 212 at operation. Details of VNFFG update procedure 400 to add an NFP, to delete an NFP, and to modify an NFP are presented below.

4.4.5 NS Instance Updating
4.4.5.x VNFFG Update to Add a NFP
FIG. 4.4.5.x-1 depicts the procedure of VNFFG update to add a NFP (Network Forwarding Path) to a VNFFG instance (see clause 7.3.5 [5]).
 1. NM sends to NFVO an UpdateNsRequest (see clause 7.3.5 of [5]) with the following parameters (see clause 7.3.5.2 of [5]) to on-board the NSD:
  nsInstanceId: the identifier of the NS instance being updated.
  updateType="UpdateVnffg" to indicate the type of update operation.
  UpdateVnffgData: the information of VNFFG to be updated (see clause 8.3.4.22.2 of [5]):
   vnffgId: Identifier of an existing VNFFG information element to be updated for the NS instance;
   nfp: Indicate the desired new NFP(s) for a given VNFFG;
   nfpName: Human readable name for the NFP;
   description: Human readable description for the NFP;
   cp: Identifier(s) of the CPs and SAPs which the NFP passes by;
   nfpRule: NFP classification and selection rule.
 2. NFVO sends to NM an UpdateNsResponse (see clause 7.3.5 of [5]) with the attributes:
  lifecycleOperationOccurrenceId: the identifier of the NS lifecycle operation occurrence;
  nfpId that is the identifier of NFP being added to the given VNFFG;
  Note: the nfpId: is currently not defined in clause 7.3.5.3 in [5].
 3. NFVO sends to NM a Notify (see clause 7.4.3 [5]) carrying an NsLifecycleChangeNotification information element with attributes nsInstanceId, lifecycleOperationOccurrenceId, operation="NsUpdate", and notificationType="start" to indicate the start of the NS instantiation (see clause 8.3.2.2 [5]).
 4. NFVO sends to NM a Notify (see clause 7.4.3 [5]) carrying an NsLifecycleChangeNotification information element with attributes nsInstanceId, lifecycleOperationOccurrenceId, operation="NsUpdate ", and notificationType="result" to indicate the end result of the NS instantiation (see clause 8.3.2.2 [5]).

4.4.5.x VNFFG Update to Delete a NFP
FIG. 4.4.5.x-1 depicts the procedure of VNFFG update to delete a NFP from a VNFFG instance (see clause 7.3.5 [5]).
 1. NM sends to NFVO an UpdateNsRequest (see clause 7.3.5 of [5]) with the following parameters (see clause 7.3.5.2 of [5]) to on-board the NSD:
  nsInstanceId: the identifier of the NS instance being updated.
  updateType="UpdateVnffg" to indicate the type of update operation.
  UpdateVnffgData: the information of the external connectivity (see clause 8.3.4.22.2 of [5]):
   vnffgId: Identifier of an existing VNFFG information element to be updated for the NS instance;
   nfpId: Identifier(s) of the NFP to be deleted from a given VNFFG. 2. NFVO sends to NM an UpdateNsResponse (see clause 7.3.5 of [5]) with the attribute nsInstanceId identifier of the lifecycleOperationOccurrenceId that is the identifier of the NS lifecycle operation occurrence,
 3. NFVO sends to NM a Notify (see clause 7.4.3 [5]) carrying an NsLifecycleChangeNotification information element with attributes nsInstanceId, lifecycleOperationOccurrenceId, operation="NsUpdate", and notificationType="start" to indicate the start of the NS instantiation (see clause 8.3.2.2 [5]).
 4. NFVO sends to NM a Notify (see clause 7.4.3 [5]) carrying an NsLifecycleChangeNotification information element with attributes nsInstanceId, lifecycleOperationOccurrenceId, operation="NsUpdate ", and notificationType="result" to indicate the end result of the NS instantiation (see clause 8.3.2.2 [5]).

4.4.5.x VNFFG Update to Modify a NFP
FIG. 4.4.5.x-1 depicts the procedure of VNFFG update to modify a NFP (Network Forwarding Path) of a VNFFG instance (see clause 7.3.5 [5]).
 1. NM sends to NFVO an UpdateNsRequest (see clause 7.3.5 of [5]) with the following parameters (see clause 7.3.5.2 of [5]) to on-board the NSD:
  nsInstanceId: the identifier of the NS instance being updated.
  updateType="UpdateVnffg" to indicate the type of update operation.
  UpdateVnffgData: the information of the external connectivity (see clause 8.3.4.22.2 of [5]):
   vnffgId: Identifier of an existing VNFFG information element to be updated for the NS instance;
   nfp: Indicate the desired new NFP(s) for a given VNFFG, and may contain one or more of the following attributes:
    nfpName: Human readable name for the NFP;
    description: Human readable description for the NFP;
    cp: Identifier(s) of the CPs and SAPs which the NFP passes by;
    nfpRule: NFP classification and selection rule.
   nfpId: Indicate the identifier of the NFP to be modified.

2. NFVO sends to NM an UpdateNsResponse (see clause 7.3.5 of [5]) with the attribute lifecycleOperationOccurrenceId that is the identifier of the NS lifecycle operation occurrence.
3. NFVO sends to NM a Notify (see clause 7.4.3 [5]) carrying an NsLifecycleChangeNotification information element with attributes nsInstanceId, lifecycleOperationOccurrenceId, operation="NsUpdate", and notificationType="start" to indicate the start of the NS instantiation (see clause 8.3.2.2 [5]).
4. NFVO sends to NM a Notify (see clause 7.4.3 [5]) carrying an NsLifecycleChangeNotification information element with attributes nsInstanceId, lifecycleOperationOccurrenceId, operation="NsUpdate ", and notificationType="result" to indicate the end result of the NS instantiation (see clause 8.3.2.2 [5]).

Figure 5:
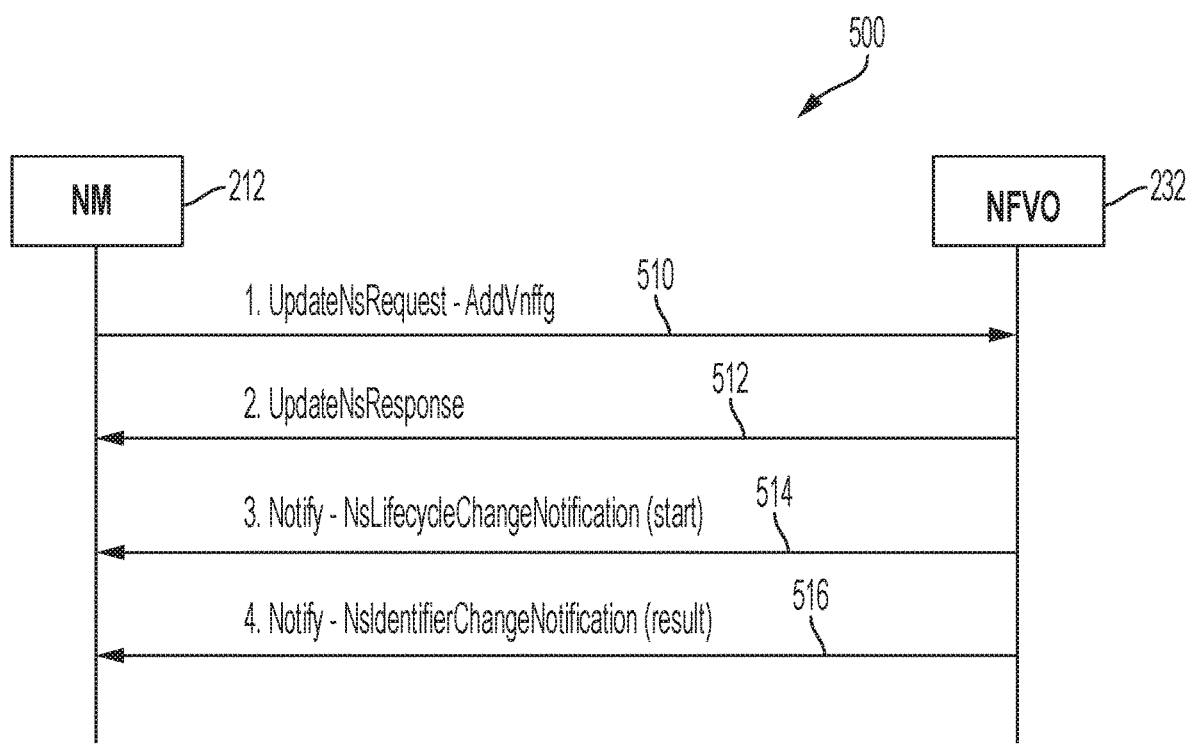
FIG. 5 is a diagram of an NS update to add a VNFFG to an NS instance in accordance with one or more embodiments.

FIG. 5 is a diagram of an NS update to add a VNFFG to an NS instance in accordance with one or more embodiments. As shown in FIG. 5, in NS update procedure 500, NM 212 sends an UpdateNsRequest—AddVnffg message to NFVO 232 at operation 510. NFVO 232 sends an UpdateNsResponse message to NM 212 at operation 512. NFVO 232 then sends a Notify—NsLifecycleChangeNotification (start) message to NM 212 at operation 514. NFVO 232 then sends a Notify—NsIdentifierChangeNotification (result) message to NM 212 at operation 516. Details of NS update procedure 500 to add a VNFFG are described below.

4.4.5,x NS Update to Add a VNFFG

FIG. 4.4.5.x-1 depicts the procedure of NS update to add a VNFFG to a NS instance (see clause 7.3.5 [5]).
1. NM sends to NFVO an UpdateNsRequest (see clause 7.3.5 of [5]) with the following parameters (see clause 7.3.5.2 of [5]) to on-board the NSD:
    nsInstanceId: the identifier of the NS instance being updated.
    updateType="AddVnffg" to indicate the type of update operation.
    AddVnffgData: the information of the VNFFG to be added (see clause 8.3.4.21.2 of [5]):
        vnffgdId: Identifier of the VNFFGD which defines the VNFFG to be added;
        vnffgName: Human readable name for the VNFFG.
        description: Human readable description for the VNFFG.
        nfp: indicate the NFP classification and selection rule for the new NFP to be added to the VNFFG instance.
    Note: > nfp is currently not defined in clause 5.3.4.22.2 in [5].
2. NFVO sends to NM an UpdateNsResponse (see clause 7.3.5 of [5]) with the attribute:
    nsInstanceId: the identifier of the NS instance lifecycleOperationOccurrenceId that is the identifier of the NS lifecycle operation occurrence;
    addedVnffgInfo: Information of the of the created VNFFG instance.
        vnffgId: Identifier of the VNFFG instance in which the NFP instances are contained;
        nfpId: Identifier(s) of the NFP to be added to a given VNFFG.
    Note: addedVnffgInfo is currently not defined in clause7.3.5.3 in [5].
3. NFVO sends to NM a Notify (see clause 7.4.3 [5]) carrying an NsLifecycleChangeNotification information element with attributes nsInstanceId, lifecycleOperationOccurrenceId, operation="NsUpdate", and notificationType="start" to indicate the start of the NS instantiation (see clause 8.3.2.2 [5]).
4. NFVO sends to NM a Notify (see clause 7.4.3 [5]) carrying an NsLifecycleChangeNotification information element with attributes nsInstanceId, lifecycleOperationOccurrenceId, operation="NsUpdate ", and notificationType="result" to indicate the end result of the NS instantiation (see clause 8.3.2.2 [5]).

Figure 6:
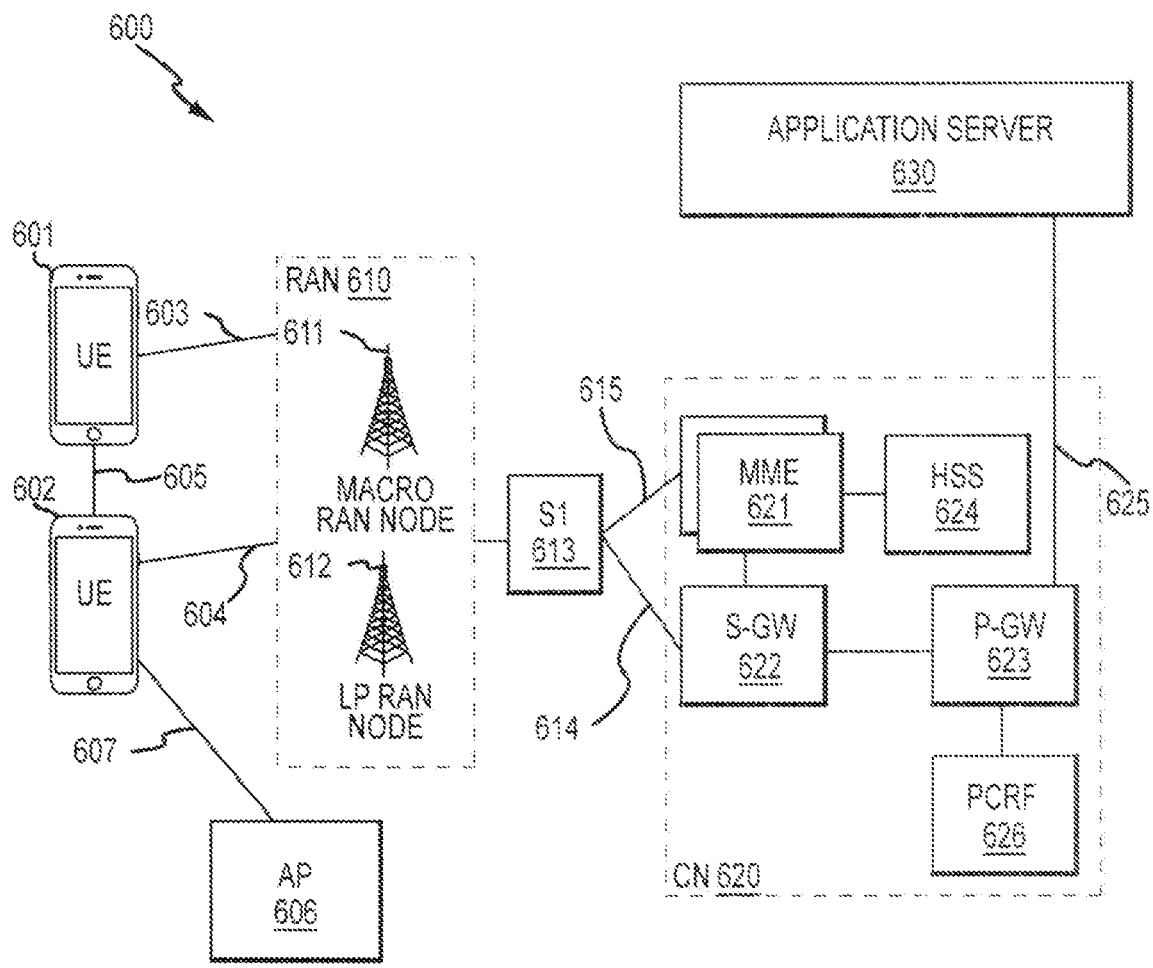
FIG. 6 illustrates an architecture of a system of a network in accordance with some embodiments.

FIG. 6 illustrates an architecture of a system 600 of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP

606 would comprise a wireless fidelity (WiFi®) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 interface 613. In embodiments, the CN 620 may be an evolved packet core (EPC) network, a NextGen Packet Core (NPC) network, or some other type of CN. In this embodiment the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Enforcement Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
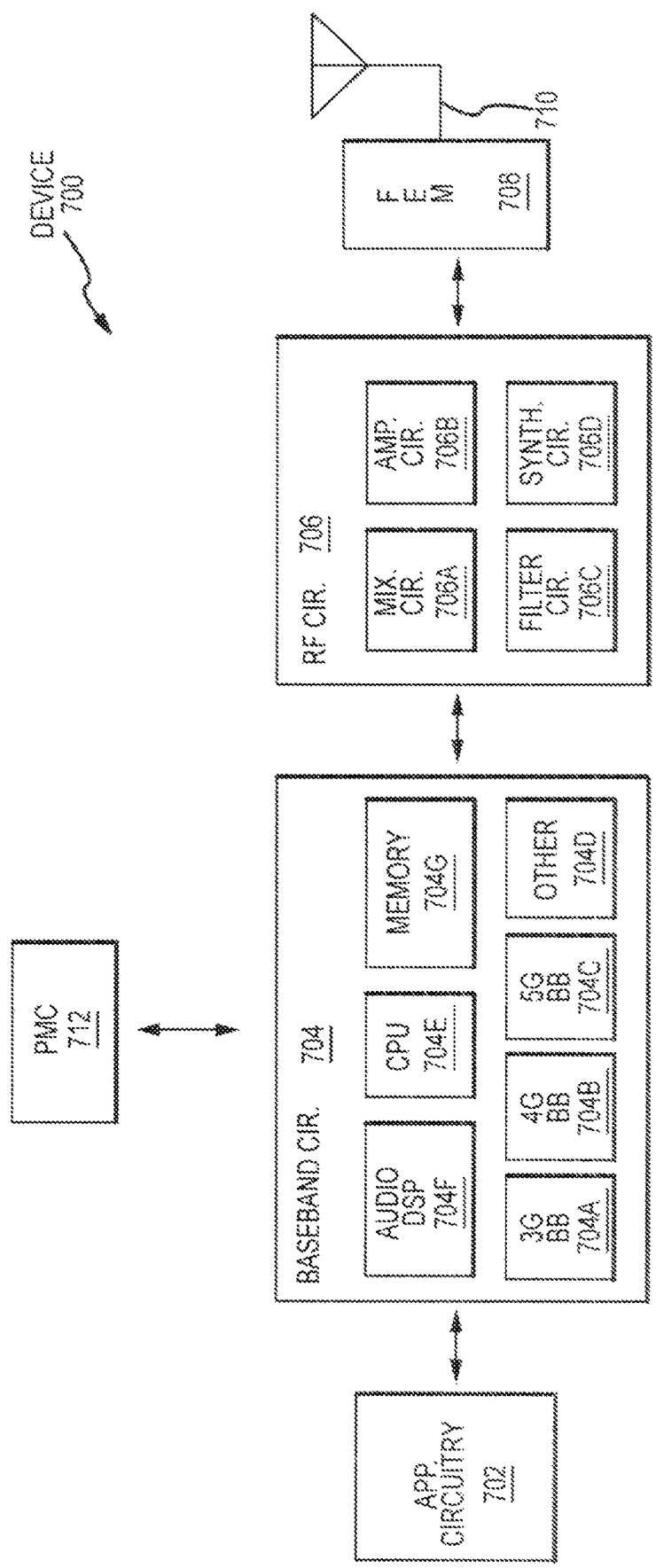
FIG. 7 illustrates example components of a device in accordance with some embodiments.

FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include less elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706*a*, amplifier circuitry 706*b* and filter circuitry 706*c*. In some embodiments, the transmit signal path of the RF circuitry 706 may include filter circuitry 706*c* and mixer circuitry 706*a*. RF circuitry 706 may also include synthesizer circuitry 706*d* for synthesizing a frequency for use by the mixer circuitry 706*a* of the receive signal path and the transmit signal path. In some embodiments, the mixer circuitry 706*a* of the receive signal path may be configured to down-convert RF signals received from the FEM circuitry 708 based on the synthesized frequency provided by synthesizer circuitry 706*d*. The amplifier circuitry 706*b* may be configured to amplify the down-converted signals and the filter circuitry 706*c* may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706*a* of the receive signal path may comprise passive mixers, although the scope of the embodiments is not limited in this respect.

In some embodiments, the mixer circuitry 706*a* of the transmit signal path may be configured to up-convert input baseband signals based on the synthesized frequency provided by the synthesizer circuitry 706*d* to generate RF output signals for the FEM circuitry 708. The baseband signals may be provided by the baseband circuitry 704 and may be filtered by filter circuitry 706*c*.

In some embodiments, the mixer circuitry 706*a* of the receive signal path and the mixer circuitry 706*a* of the transmit signal path may include two or more mixers and may be arranged for quadrature downconversion and upconversion, respectively. In some embodiments, the mixer circuitry 706*a* of the receive signal path and the mixer circuitry 706*a* of the transmit signal path may include two or more mixers and may be arranged for image rejection (e.g., Hartley image rejection). In some embodiments, the mixer circuitry 706*a* of the receive signal path and the mixer circuitry 706*a* may be arranged for direct downconversion and direct upconversion, respectively. In some embodiments, the mixer circuitry 706*a* of the receive signal path and the mixer circuitry 706*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706. In some dual-mode embodiments, a separate radio IC circuitry may be provided for processing signals for each spectrum, although the scope of the embodiments is not limited in this respect.

In some embodiments, the synthesizer circuitry 706*d* may be a fractional-N synthesizer or a fractional N/N+1 synthesizer, although the scope of the embodiments is not limited in this respect as other types of frequency synthesizers may be suitable. For example, synthesizer circuitry 706*d* may be a delta-sigma synthesizer, a frequency multiplier, or a synthesizer comprising a phase-locked loop with a frequency divider. The synthesizer circuitry 706*d* may be configured to synthesize an output frequency for use by the mixer circuitry 706*a* of the RF circuitry 706 based on a frequency input and a divider control input. In some embodiments, the synthesizer circuitry 706*d* may be a fractional N/N+1 synthesizer.

In some embodiments, frequency input may be provided by a voltage-controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706*d* of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM 708, or in both the RF circuitry 706 and the FEM 708.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

While FIG. 7 shows the PMC 712 coupled only with the baseband circuitry 704. In other embodiments, however, the PMC 712 may be additionally or alternatively coupled with, and perform similar power management operations for, other components such as, but not limited to, application circuitry 702, RF circuitry 706, or FEM 708.

In some embodiments, the PMC 712 may control, or otherwise be part of, various power saving mechanisms of the device 700. For example, if the device 700 is in an RRC Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used execute Layer 3, Layer 2, or Layer 1 functionality, while processors of the application circuitry 704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
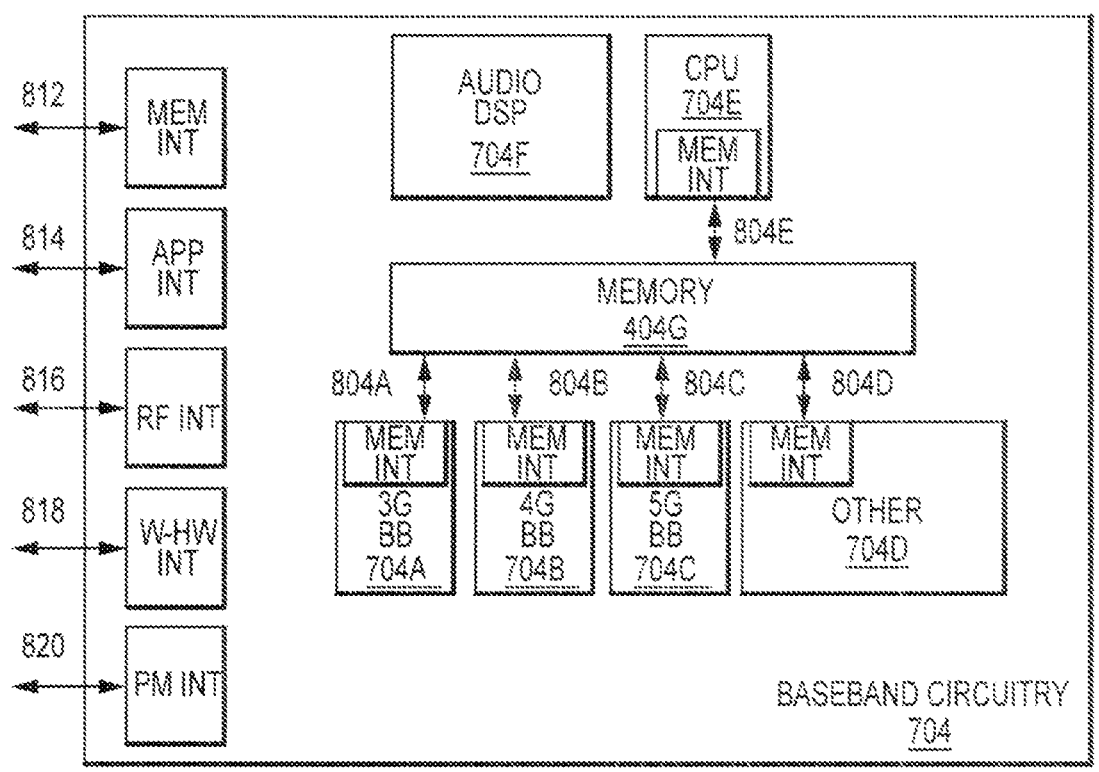
FIG. 8 illustrates example interfaces of baseband circuitry in accordance with some embodiments.

FIG. 8 illustrates example interfaces of baseband circuitry in accordance with some embodiments. As discussed above, the baseband circuitry 704 of FIG. 7 may comprise processors 704A-704E and a memory 704G utilized by said processors. Each of the processors 704A-704E may include a memory interface, 804A-804E, respectively, to send/receive data to/from the memory 704G.

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712.

Although the claimed subject matter has been described with a certain degree of particularity, it should be recognized that elements thereof may be altered by persons skilled in the art without departing from the spirit and/or scope of claimed subject matter. It is believed that the subject matter pertaining to managing virtual links in a network service instance and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a Network Manager (NM), comprising:
one or more processors to send a Network Service (NS) update request to a Network Function Virtualization Orchestrator (NFVO) to add external connectivity to a Physical Network Function (PNF) instance or a Virtual Network Function (VNF) instance in an NS instance, wherein the NS update request comprises an attribute identifying an external connection point or an external link port for the PNF instance or the VNF instance, the one or more processors to receive an operation result containing a lifecycle operation occurrence identifier from the NFVO, to receive a lifecycle change notification from the NFVO indicating a start of an NS update, and to receive an NS Lifecycle Change notification from the NFVO indicating a result of the NS update; and
a memory to store the result of the NS update.

2. The apparatus of claim 1, wherein the one or more processors are to send an NS update request to the NFVO to add a virtual link to the NS instance, to receive from the NFVO an operation result containing a lifecycle operation occurrence identifier, to receive from NFVO an NS Lifecycle Change notification indicating a start of NS update, and to receive from the NFVO an NS Lifecycle Change notification indicating a result of the NS update.

3. The apparatus of claim 1, wherein the one or more processors are to send an NS update request to the NFVO to remove a virtual link from the NS instance, to receive from NFVO an operation result containing a lifecycle operation occurrence identifier, to receive from the NFVO an NS Lifecycle Change notification indicating the start of NS update, and to receive from the NFVO a NS Lifecycle Change notification indicating a result of the NS update.

4. The apparatus of claim 1, wherein the one or more processors are to send an NS update request to the NFVO to change the external connectivity to the PNF instance, the NS update request containing the following attributes:
nsInstanceId: the identifier of the NS instance being updated;
updateType="ChangeExtPnfConnectivity" to indicate the type of update operation; and
changeExtPnfConnectivityData: new external connectivity data of the PNF to be changed;
wherein changeExtPnfConnectivityData contains the following attributes
pnfId: the identifier of the PNF; and
pnfConnectivityData: Information about the PNF connectivity; and
wherein pnfConnectivityData contains the following attributes
extVirtualLinkId: Identifier of an external VL instance;
extCp: External CPs of the VNF to be connected to the external VL instance; and
extLinkPorts: link ports to be used to connect external connection points to the external VL instance.

5. The apparatus of claim 2, wherein the NS update request to add the virtual link to the NS instance contains the following attributes:
nsInstanceId: the identifier of the NS instance being updated;
updateType="AddVirtualLink" to indicate the type of update operation; and
addVirtualLinkData: the information of the virtual link to be added to a NS instance;
wherein add VirtualLinkData contains virtualLinkProfileId that is the identifier of VirtualLinkProfile.

6. The apparatus of claim 1, wherein the NS update request to add the external connectivity to the PNF instance or the VNF instance contains the following attributes:
nsInstanceId: the identifier of the NS instance being updated;
updateType="AddExtConnectivity" to indicate the type of update operation; and
addExtConnectivityData: the information of the external connectivity;
wherein addExtConnectivityData contains the following attributes:
vnfInstanceId: the identifier of the existing VNF instance;
extVirtualLinkData: information about the external VL to be added to the VNF instance;
pnfId: the identifier of the PNF; and
pnfConnectivityData: Information about the PNF connectivity;
wherein pnfConnectivityData contains the following attributes:
extVirtualLinkId: Identifier of an external VL instance;
extCp: External CPs of the VNF to be connected to the external VL instance; and
extLinkPorts: link ports to be used to connect external connection points to the external VL instance.

7. The apparatus of claim 1, wherein the one or more processors are to send an NS update request to add a VNF instance with external connectivity to the NS instance, the NS update request containing the following attributes:
nsInstanceId: the identifier of the NS instance being updated;
updateType="AddVnf" to indicate the type of update operation; and
VnfInstanceData: the information of the VNF instance to be added to the NS;
wherein VnfInstanceData contains the following attributes:
vnfInstanceId: the identifier of the existing VNF instance;
vnfProfileId: the identifier of the vnfProfile defined in the NSD for an existing VNF instance; and
extVirtualLinkData: information about the external VL to be added to the VNF instance.

8. An apparatus of a Network Function Virtualization Orchestrator (NFVO), comprising:
one or more processors to receive a request from a Network Manager (NM) to update a Network Service (NS) to add external connectivity to a physical network function (PNF) instance or a virtual network function (VNF) instance, wherein the request comprises an attribute identifying an external connection point or an external link port for the PNF instance or the VNF instance, the one or more processors to send to the NM an NS update operation result containing a lifecycle operation occurrence identifier, to send to the NM an NS Lifecycle Change notification indicating a start of the NS update, to connect the PNF instance or the VNF instance to an NS virtual link per the request, and to send to the NM a NS Lifecycle Change notification indicating a result of the NS update; and
a memory to store the request from the NM.

9. The apparatus of claim 8, wherein the one or more processors are to receive a request from the NM to update the NS to add a virtual link to an NS instance, to send to the NM an NS update operation result containing a lifecycle operation occurrence identifier, to send to the NM an NS Lifecycle Change notification indicating the start of an NS update, to add the virtual link to the NS instance as per the request, and to send to the NM an NS Lifecycle Change notification indicating a result of the NS update.

10. The apparatus of claim 8, wherein the one or more processors are to receive a request from the NM to update the NS to remove a virtual link from an NS instance, to send to the NM an NS update operation result containing a lifecycle operation occurrence identifier, to send to the NM an NS Lifecycle Change notification indicating the start of an NS update, to remove the virtual link from the NS instance per the request, and to send to the NM an NS Lifecycle Change notification indicating the result of the NS update.

11. One or more non-transitory storage media having instructions stored thereon that, when executed by a Network Manger (NM), result in:
sending a Network Service (NS) update request to a Network Function Virtualization Orchestrator (NFVO) to initiate an NS update operation, wherein the NS update request comprises an attribute identifying an external connection point or an external link port for a PNF instance or a VNF instance, the one or more processors;
receiving from the NFVO an operation result containing a lifecycle operation occurrence identifier;

receiving from the NFVO an NS Lifecycle Change notification indicating a start of an NS update; and receiving from the NFVO an NS Lifecycle Change notification to indicating a result of the NS update.

12. The one or more non-transitory storage media of claim 11, wherein the NS update operation is to add a Virtual Network Function Forwarding Graph (VNFFG) instance containing one or more Network Forwarding Paths (NFPs) to an NS instance with the following attributes:
nsInstanceId: the identifier of the NS instance being updated;
updateType="AddVnffg" to indicate the type of update operation; and
addVnffgData: the information of the VNFFG to be added.

13. The one or more non-transitory storage media of claim 12, wherein the NS update operation is to add one or more NFPs to the VNFFG instance in an NS instance via an VNFFG update action.

14. The one or more non-transitory storage media of claim 12, wherein the NS update operation is to delete one or more NFPs from the VNFFG instance in an NS instance via an VNFFG update action.

15. The one or more non-transitory storage media of claim 12, wherein the NS update operation is to delete the NFPs from the VNFFG instance in an NS instance with the following attributes:
nsInstanceId: the identifier of the NS instance being updated;
updateType="UpdateVnffg" to indicate the type of update operation; and
updateVnffgData: the information of VNFFG to be updated.

16. The one or more non-transitory storage media of claim 15, wherein the updateVnffgData contains the following attributes:
vnffgId: Identifier of the VNFFG instance to be updated; and
nfpId: identifier of the NFP instances to be deleted.

17. The one or more non-transitory storage media of claim 12, wherein the NS update operation is to modify one or more NFPs in the VNFFG instance in a NS instance via an VNFFG update action.

18. The one or more non-transitory storage media of claim 12, wherein the NS update operation is to modify the NFPs in the VNFFG instance in an NS instance with the following attributes:
nsInstanceId: the identifier of the NS instance being updated;
updateType="UpdateVnffg" to indicate the type of update operation; and
updateVnffgData: the information of VNFFG to be updated.

19. The one or more non-transitory storage media of claim 18, wherein the updateVnffgData contains the following attributes:
vnffgId: Identifier of the VNFFG instance to be updated;
nfp: Indicate the desired new NFP(s) for a given VNFFG, and may contain one or more of the following attributes; and
nfpId: Indicate the identifier of the NFP to be modified.

* * * * *

UNITED STATES PATENT AND TRADEMARK OFFICE
CERTIFICATE OF CORRECTION

PATENT NO. : 11,082,299 B2
APPLICATION NO. : 16/357959
DATED : August 3, 2021
INVENTOR(S) : Chou et al.

Page 1 of 1

It is certified that error appears in the above-identified patent and that said Letters Patent is hereby corrected as shown below:

In the Claims

Claim 11, Column 31, Lines 3-4:
"receiving from the NFVO an NS Lifecycle Change notification to indicating a result of the NS update." should read "receiving from the NFVO an NS Lifecycle Change notification indicating a result of the NS update."

Signed and Sealed this
Fifth Day of October, 2021

Drew Hirshfeld
*Performing the Functions and Duties of the
Under Secretary of Commerce for Intellectual Property and
Director of the United States Patent and Trademark Office*